(12) United States Patent
Cheng et al.

(10) Patent No.: US 7,065,027 B2
(45) Date of Patent: Jun. 20, 2006

(54) METHOD FOR RECOVERING DATA AND CONTROL CHIP UTILIZING THE SAME

(75) Inventors: Kalman Cheng, Taipei (TW); Ching-Wen Mar, Taipei (TW)

(73) Assignee: Via Technologies, Inc., Shindian (TW)

( * ) Notice: Subject to any disclaimer, the term of this patent is extended or adjusted under 35 U.S.C. 154(b) by 330 days.

(21) Appl. No.: 10/420,304

(22) Filed: Apr. 22, 2003

(65) Prior Publication Data
US 2003/0198167 A1    Oct. 23, 2003

(30) Foreign Application Priority Data
Apr. 23, 2002    (TW) .............................. 91108301 A

(51) Int. Cl.
*G11B 7/005* (2006.01)

(52) U.S. Cl. ................. 369/59.18; 369/59.21
(58) Field of Classification Search ............. 369/59.18
See application file for complete search history.

(56) References Cited

U.S. PATENT DOCUMENTS

| | | | | |
|---|---|---|---|---|
| 5,576,842 A | * | 11/1996 | Choi ........................ | 386/46 |
| 6,014,768 A | * | 1/2000 | Lee et al. ................ | 714/795 |
| 6,272,105 B1 | * | 8/2001 | Hayashi ................ | 369/275.3 |

* cited by examiner

*Primary Examiner*—Andrea Wellington
*Assistant Examiner*—Lixi Chow
(74) *Attorney, Agent, or Firm*—Volpe and Koenig, P.C.

(57) ABSTRACT

A method for locating an electric level distribution range of sampled signals is provided. The electric level distribution range includes a plurality of reference levels. Firstly, a plurality of initial values are provided. Then, each of the sampled signals is corresponded to one of the plurality of initial values, which is closest thereto. Then, the initial values corresponded are and adjusted by the sampled signals according to a predetermined operation, thereby realizing the reference levels. A method for recovering data from an optical storage medium is also provided. The signals associated with data from an optical storage medium are firstly sampled. Then, an electric level distribution range of the sampled signals is located. Afterwards, the sampled signals are decoded to recover data according to the electric level distribution range.

14 Claims, 7 Drawing Sheets

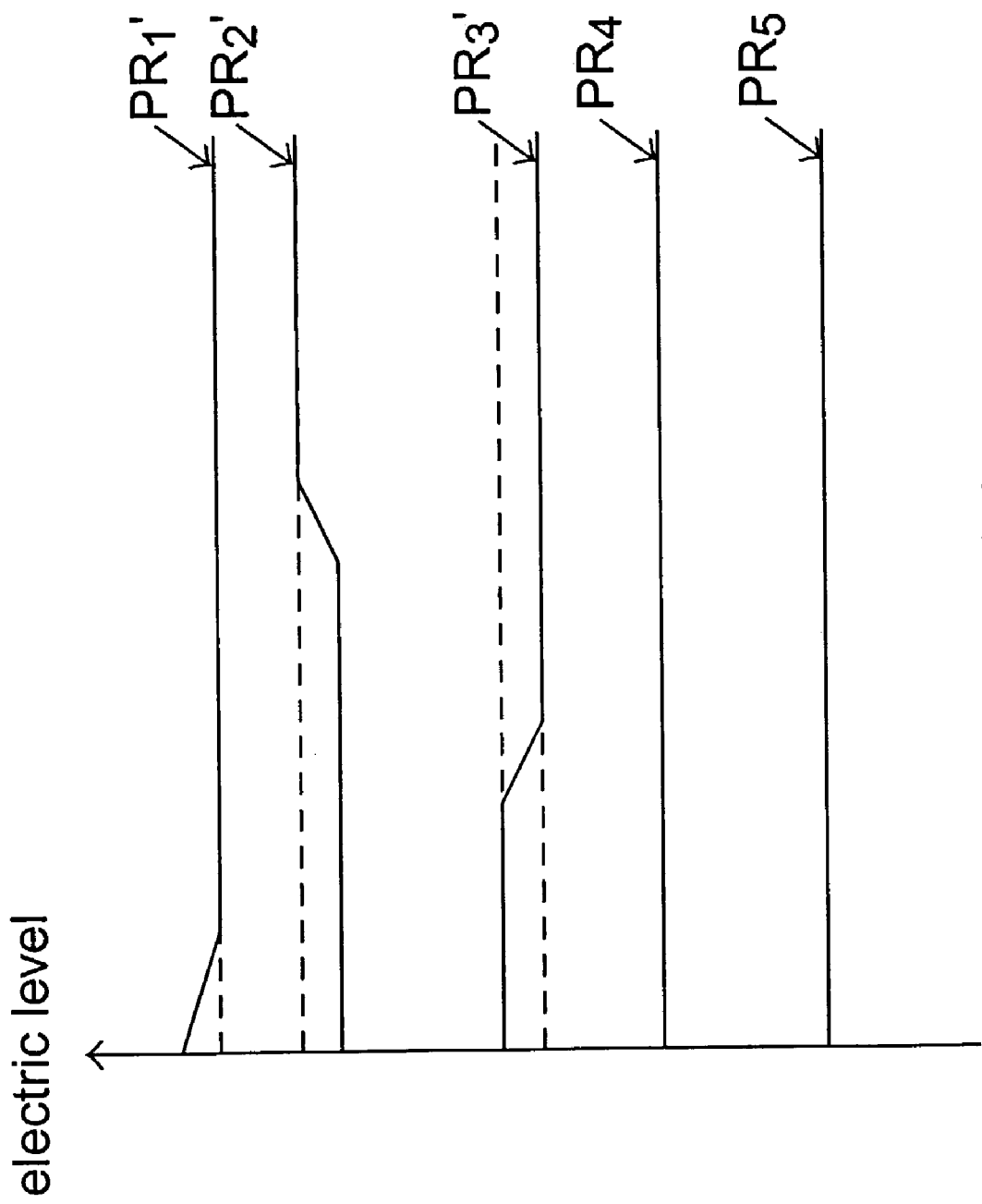

METHOD FOR RECOVERING DATA AND CONTROL CHIP UTILIZING THE SAME

FIELD OF THE INVENTION

The present invention relates to a method for recovering data from an optical storage medium, and more particularly to a method for recovering data by properly locating the electric level distribution range of sampled signals associated with the data. The present invention also relates to a method for locating an electric level distribution range of sampled signals and a control chip utilizing the method to recover data.

BACKGROUND OF THE INVENTION

Optical storage media such as compact disks (CDs), video compact disks (VCDs) and digital versatile disk (DVDs) are widely employed to store considerable digital data. In order to enhance reproducing quality of the optical storage media, it is required to accurately and quickly read out the stored digital data.

Since some uncontrolled factors adversely affect the optical disks during manufacturing, the signals inevitably decay or are interfered with while being decoded/transmitted. Therefore, it is important to recover the original digital data in the following procedure.

Please refer to FIG. 1. An optical storage medium input apparatus 10 comprises an optical pickup head 11, a reading device 12, a signal line B, an RF amplifier 13, a sampling device 14, a cosine filter 151, an adaptive machine 152, and a decoding device 16. The reading device 12, the signal line B and the RF amplifier 13 are also referred to as a channel response CR. The original digital data Is1 stored in storage medium D, for example a CD or a DVD, are converted into corresponding analog data Is2 through the channel response CR to be inputted to the sampling device 14. In general, the channel response CR includes a full response and a partial response, which are well known in the art and need not be described in details herein.

The analog data Is2 is then transmitted into the sampling device 14. The sampling device 14 principally comprises an analog/digital (A/D) converter, an equalizer and a phase-locked loop circuit (not shown) for converting the analog signals Is2 into corresponding sampled signals Y1~Yn in digital forms. These sampled signals Y1~Yn are compensated by the filter 151 and the adaptive machine 152 to generate compensated signals R1~Rn. As previously described, the sampled signals Y1~Yn might be distorted. In particular, when the analog data signal Is2 is operated at a high frequency, the sampled signals Y1~Yn are likely to be deviated from predetermined reference electric levels PR_level due to some non-linear factors. Thus, the cosine filter 151 and the adaptive machine 152 are employed to compensate such deviations, which will be described later, in order to have the output compensated signals R1~Rn approximate respective reference electric levels. Then, the compensated signals R1~Rn, which are distributed at respective reference electric levels PR_level, are sent into the decoding device 16. The decoding device 16 comprises at least a Viterbi decoder. The decoding device 16 decodes the compensated signals R1~Rn and output the decoded data Is3 similar to the original digital data Is1. In such way, the digital data stored in the storage medium D are recovered.

The sampled signals Y1~Yn are inputted to both of the cosine filter 151 and the adaptive machine 152 for compensation. The process for compensating the above-described deviation comprises steps of determining the respective differences (E1~En) between the sampled signals (Y1~Yn) and the compensated signals (R1~Rn), and feeding the differences E1~En back to the consine filter 151. The related formulae are as follows:

$$R_n = CY_{n-4} + Y_{n-2} + CY_n$$

$$E_n = Y_n - R_n$$

$$C_{n+1} = C_n + \gamma E_n (Y_{n-4} + Y_n)$$

in which, $Y_n$ is the nth sampling signal, $Y_{n-2}$ is the (n−2)th sampling signal, $Y_{n-4}$ is the (n−4)th sampling signal, $R_n$ is the nth compensated signal, $E_n$ is the difference between $Y_n$ and $R_n$, $\gamma$ is an operational factor, and $C$, $C_n$ and $C_{n+1}$ are coefficients.

Since the coefficients are difficult to be determined by calculation and such calculation sometimes results in no solution, all the sampled signals (Y1~Yn) might not be correctly compensated to recover the digital data Is1 via the decoding device 16. In other words, the bit error rate (BER) is relatively significant.

SUMMARY OF THE INVENTION

It is an object of the present invention to provide a method for correctly locating an electric level distribution range of sampled signals and a method for recovering data without involving the prior art compensation operation. In stead, a sampled signal tracing operation is performed to adjust the reference level, so as to correctly locate the electric level distribution range of the sampled signals, and thus reduce the bit error rate upon recovering data.

It is another object of the present invention to provide a control chip for use in an optical storage medium input apparatus. The control chip allows sampled signals to be recovered into original data from an optical storage medium by way of a sampled signal tracing method.

In accordance with an aspect of the present invention, there is provided a method for locating an electric level distribution range of sampled signals, wherein the electric level distribution range includes a plurality of reference levels. Firstly, a plurality of initial values are provided. Then, each of the sampled signals is corresponded to one of the plurality of initial values, which is closest thereto. Then, the initial values corresponded are adjusted in view of the sampled signals according to a predetermined operation, thereby realizing the reference levels.

In an embodiment, the adjusting step of the initial values is performed one by one of the sampled signals. Alternatively, the adjusting step of the initial values is performed group by group of the sampled signals.

In an embodiment, the predetermined operation is least mean square (LMS) operation performed by means of the following equations:

$$\frac{\partial (z-lx)^2}{\partial lx} = -2(z-lx) \qquad (1)$$

$$lx' = lx + \gamma(z-lx) \qquad (2)$$

where
- lx' is one of the reference levels,
- γ is an operation factor,
- z is an electric level of one of the sampled signals, and
- lx is one of the initial values, which is corresponded by the one of the sampled signals.

Preferably, the initial values are interlacingly adjusted.

For example, the sampled signals are synchronously sampled signals.

In accordance with another aspect of the present invention, there is provided a method for recovering data from an optical storage medium. Firstly, signals associated with data from an optical storage medium are sampled. Then, an electric level distribution range of the sampled signals is located. Afterwards, the sampled signals are decoded to recover data according to the electric level distribution range.

In an embodiment, the electric level distribution range includes a plurality of reference levels, and the sampled signals are decoded according to the plurality of reference levels.

In accordance with another aspect of the present invention, there is provided a control chip for use with an optical storage medium. The control chip comprises a sampling device, an adjusting device and a decoding device. The sampling device generates sampled signals according to data stored in the optical storage medium. The adjusting device is in communication with the sampling device, and locates reference levels according to electric levels of the sampled signals and a plurality of preset levels. The decoding device is in communication with the adjusting device, and recovers data according to the sampled signals and the reference levels.

For example, the optical storage medium is an optical disc.

For example, the sampling device generates the sampled signals by means of a synchronously sampling procedure.

In an embodiment, the adjusting device performs a first operation to correspond each of the sampled signals to one of the plurality of preset levels, which is closest to the sampled signal, and adjusting the preset levels corresponded by the sampled signals into the reference levels according to a second operation.

In an embodiment, the second operation procedure is a least mean square (LMS) operation performed by means of equations:

$$\frac{\partial (z-lx)^2}{\partial lx} = -2(z-lx) \quad (1)$$

$$lx'=lx+\gamma(z-lx) \quad (2)$$

where
- lx' is one of the reference levels,
- γ is an operation factor,
- z is an electric level of one of the sampled signals, and
- lx is one of the initial values, which is corresponded by the one of the sampled signals.

The above objects and advantages of the present invention will become more readily apparent to those ordinarily skilled in the art after reviewing the following detailed description and accompanying drawings, in which:

BRIEF DESCRIPTION OF THE DRAWINGS

FIGS. 3(a)~(d) are schematic diagrams illustrating the process for locating reference levels of sampled signals according to another preferred embodiment of the present invention.

DETAILED DESCRIPTION OF THE PREFERRED EMBODIMENT

Figure 1:
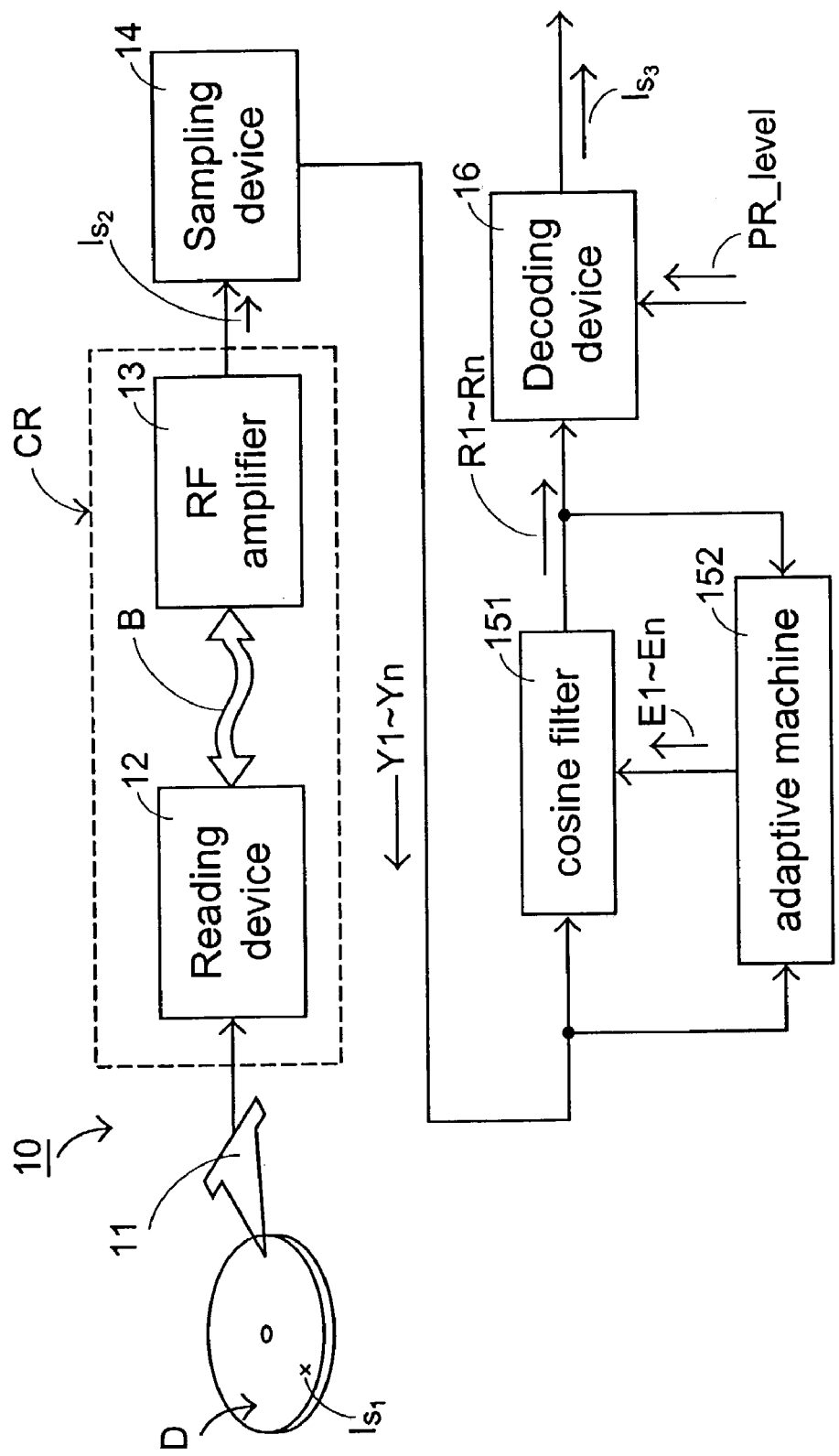
FIG. 1 is a circuit block diagram of a conventional optical storage medium input apparatus.
Figure 2:
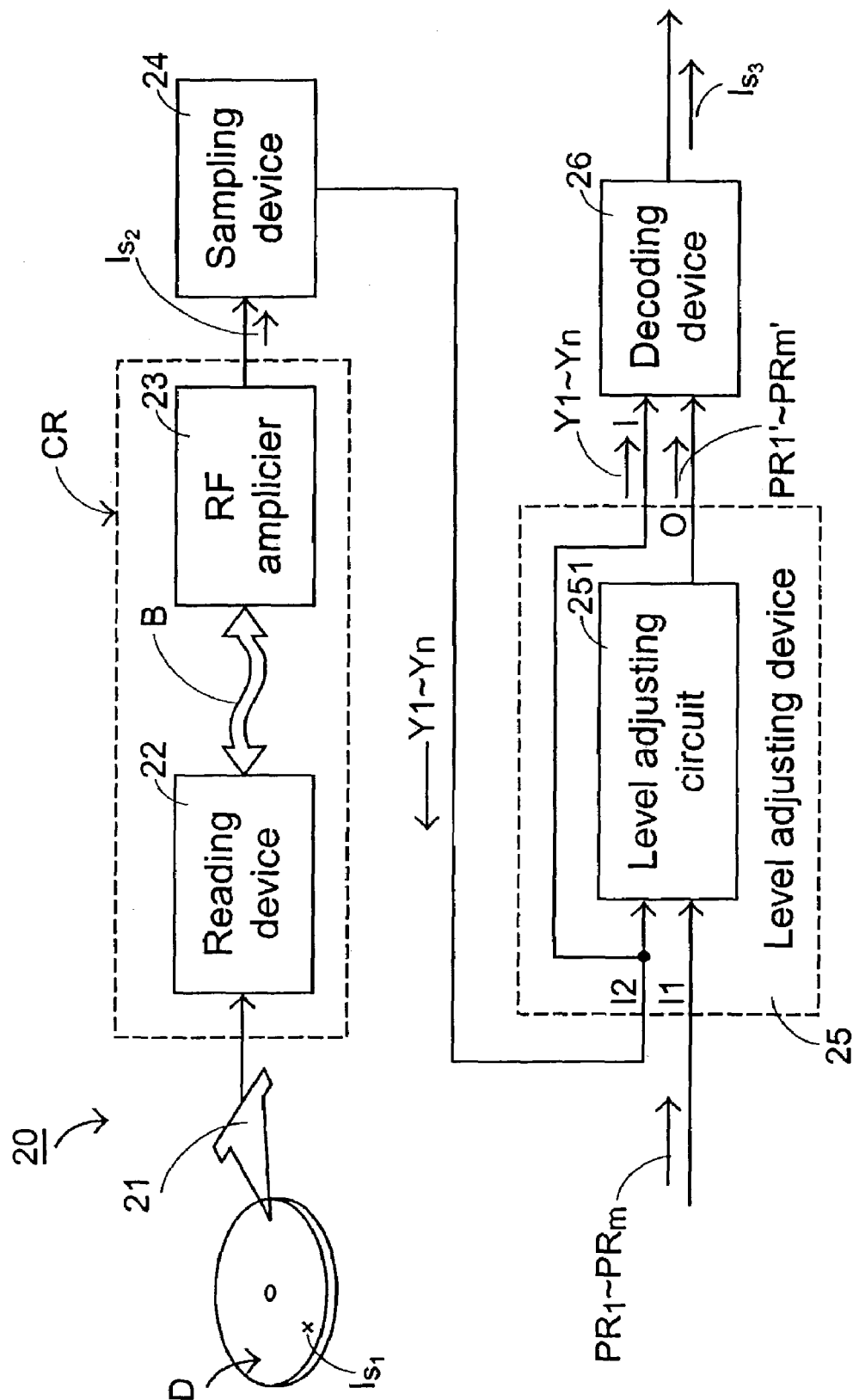
FIG. 2 is a circuit block diagram of an optical storage medium input apparatus according to a preferred embodiment of the present invention.

Please refer to FIG. 2. An optical storage medium input apparatus 20 according to the present invention comprises an optical pickup head 21, a reading device 22, a signal line B, an RF amplifier 23, a sampling device 24, a level adjusting device 25 and a decoding device 26. The reading device 22, the signal line B and the RF amplifier 23 are also referred to as a channel response CR. The original digital data Is1 stored in storage medium D, for example a CD or a DVD, are converted into corresponding analog data Is2 through the channel response CR, and then transmitted to the sampling device 24. In general, the channel response CR includes a full response and a partial response, which are well known in the art and need not be described in details herein.

The sampling device 24 principally comprises an analog/digital (A/D) converter, an equalizer and a phase-locked loop circuit (not shown) for converting the analog signals Is2 into corresponding sampled signals Y1~Yn in digital forms. For example, the analog/digital (A/D) converter can have a resolution of 5, 6 or 7 bits, and the sampled signals Y1~Yn are synchronously sampled.

The level adjusting device 25 is used for locating an electric level distribution range of sampled signals and comprises a level adjusting unit 251, a first input end I1, a second input end I2, an output end O. A plurality of preset levels PR1~PRm are received by the level adjusting unit 251 via the input ends I1. The sampled signals Y1~Yn are transmitted to the level adjusting unit 251 and the decoding device 26 via the input ends I2 and I, respectively. The preset levels PR1~PRm are processed by the level adjusting unit 251 into reference levels PR1'~PRm', and then transmitted into the decoding device 26 via the output end O.

The decoding device 26 comprises at least a Viterbi decoder. The decoding device 26 decodes the sampled signals Y1~Yn according to reference levels PR1'~PRm' and outputs the decoded data Is3 as the recovered digital data Is1.

A processing method of the level adjusting unit 251 for realizing the reference levels PR1'~PRm' according to the preset levels PR1~PRm and the sampled signals Y1~Yn are described hereinafter. Firstly, m preset levels PR1~PRm and n sampled signals Y1~Yn are transmitted to the level adjusting unit 251 via the first and the second input ends I1 and I2, respectively. The sampled signals Y1~Yn are inputted to the level adjusting unit 251 one by one and corresponds to one of the preset levels PR1~PRm, which is closest thereto. Then, the preset levels PR1~PRm corresponded by the sampled signals Y1~Yn are adjusted by the level adjusting unit 251 into corresponding reference levels PR1'~PRm' according to a predetermined operation. Preferably, the preset levels PR1~PRm are interlacingly adjusted. For example, when the preset level PR2 is adjusted, the other preset levels are kept unchanged. Finally, the reference levels PR1'~PRm' are outputted via the output end O.

Specifically, the predetermined operation is a least mean square (LMS) operation, and performed by means of the following equations:

$$\frac{\partial (z-lx)^2}{\partial lx} = -2(z-lx) \quad (1)$$

$$lx' = lx + \gamma(z-lx) \quad (2)$$

where
- lx' is one of the reference levels PR1'~PRm',
- γ is an operation factor,
- z is an electric level of one of the sampled signals Y1~Yn, and
- lx is one of the preset levels PR1~PRm, which is corresponded by the one of the sampled signals Y1~Yn.

In a case where m=4, the preset levels PR1~PRm can be 2, 1, −1 and −2, respectively. In another case where m=5, the preset levels PR1~PRm can be 2, 1, 0, −1 and −2, respectively. The operation factor γ is a constant, for example 0.125.

Figure 3A:
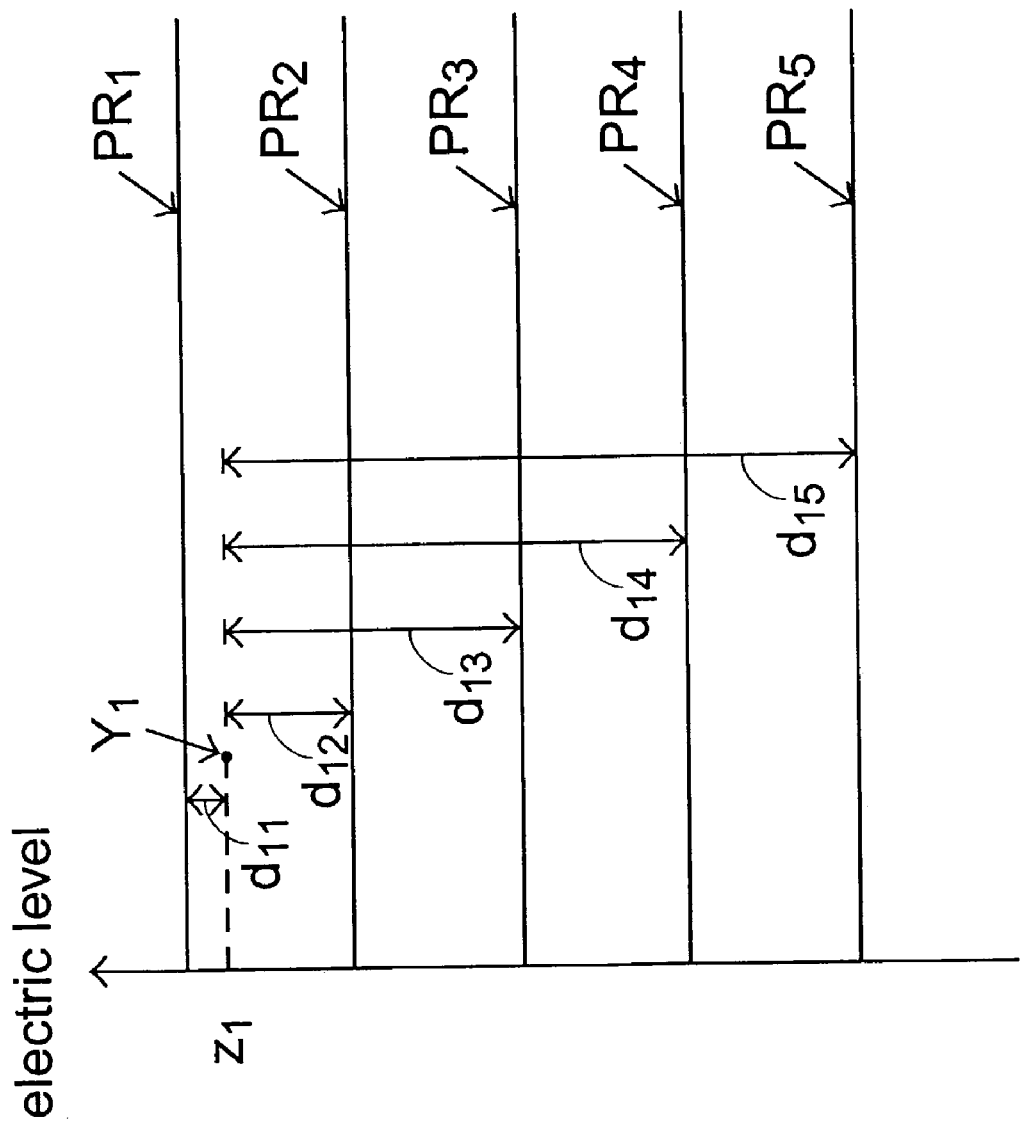
Figure 3B:
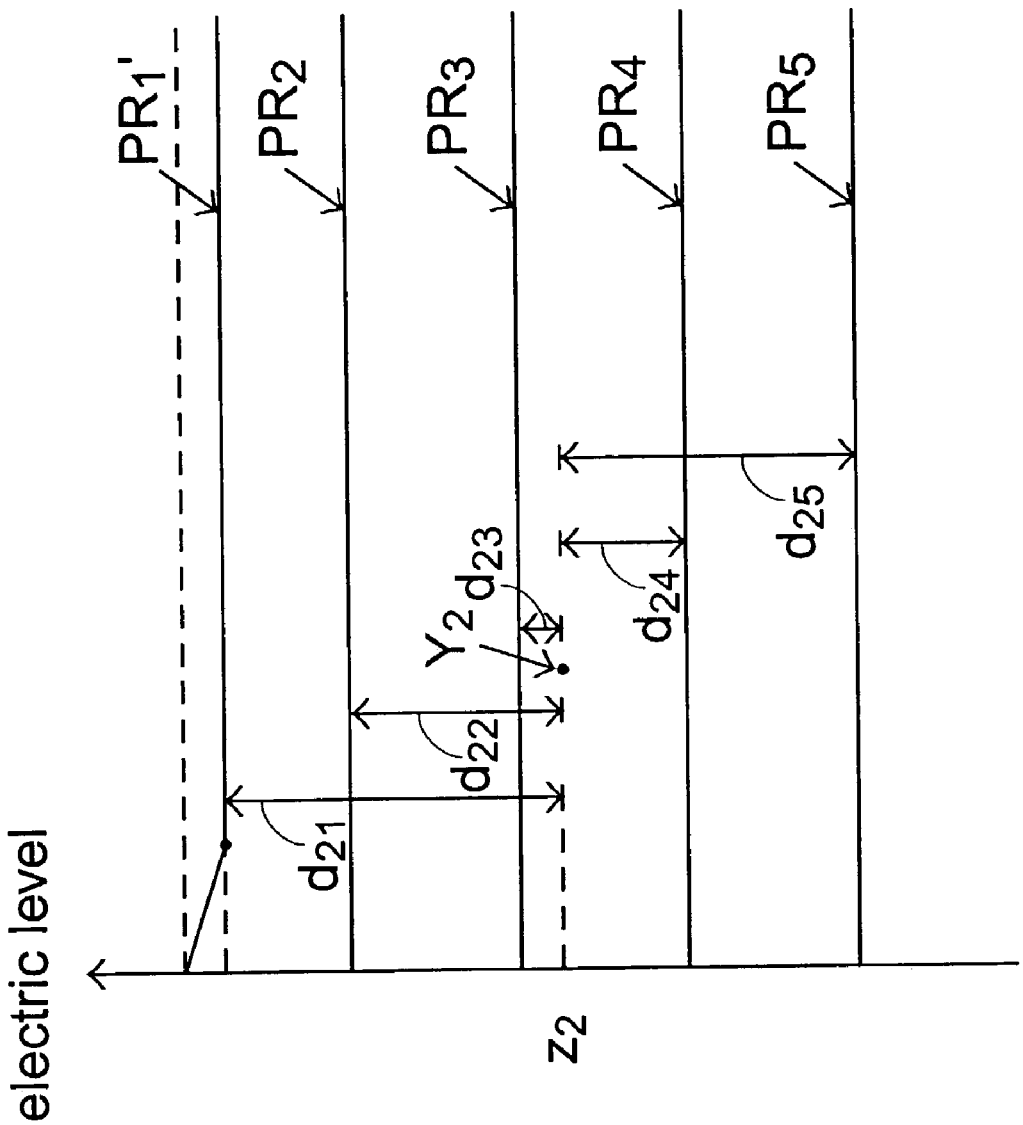

FIGS. 3(a)~(d) are schematic diagrams illustrating the process for locating reference levels of sampled signals. In this example, n sampled signals Y1~Yn are processed according to five preset levels PR1~PR5 in an increasing order. When the first sampled signal Y1 with an electric level z1 is transmitted to the level adjusting unit 251 of FIG. 2, the level differences between the electric level z1 and the preset levels PR1~PR5 are calculated to be d11~d15, respectively. As in the example shown in FIG. 3(a), the level PR1 is the closest one to the electric level z1 because the level difference d11 is the smallest among the level differences d11~d15. As shown in FIG. 3(b), the preset level PR1 is adjusted by the level adjusting unit 251 into a reference level PR1' in view of the electric level z1 according to the above predetermined operation, i.e. the least mean square (LMS) operation.

Figure 3C:
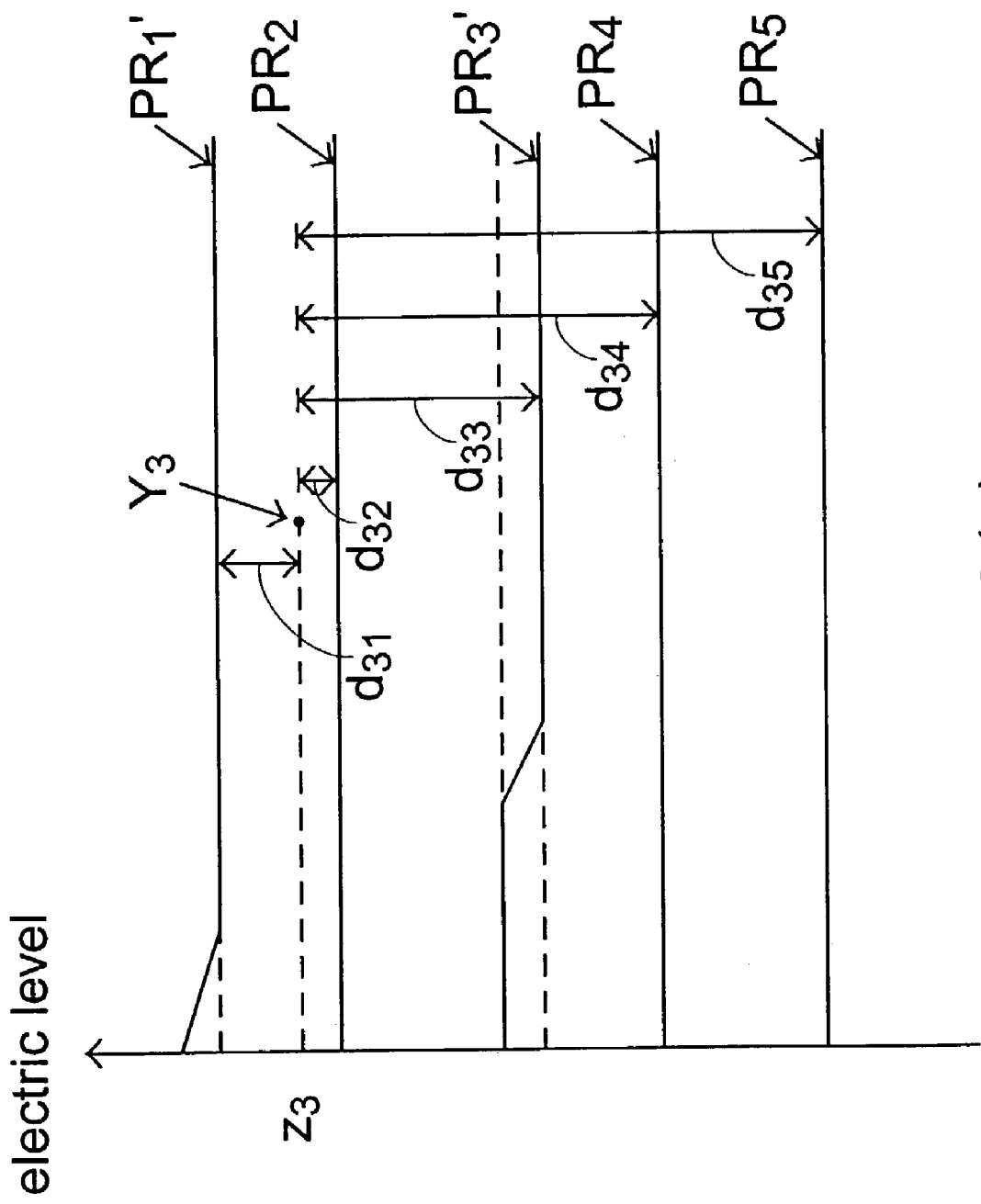

Likewise, the second sampled signal Y2 with an electric level z2 is transmitted to the level adjusting unit 251 of FIG. 2. The level differences between the electric level z2 and the preset levels PR1', PR2, PR3, PR4 and PR5 are calculated to be d21~d25, respectively. It is found that the level PR3 is the closest one to the electric level z2 due to the smallest level difference d23 among the level differences d21~d25. As shown in FIG. 3(c), the level PR3 is adjusted by the level adjusting unit 251 into a reference level PR3' in view of the electric level z2 according to the above predetermined operation.

Further, the electric level z3 of the third sampled signal Y3 is compared with the levels PR1', PR2, PR3', PR4 and PR5, and difference values d31~d35 are obtained, respectively. It is found that the level PR2 is the closest one to the electric level z3. As shown in FIG. 3(d), the level PR2 is adjusted by the level adjusting unit 251 into a reference level PR2' in view of the electric level z3 according to the above predetermined operation.

Figure 4:
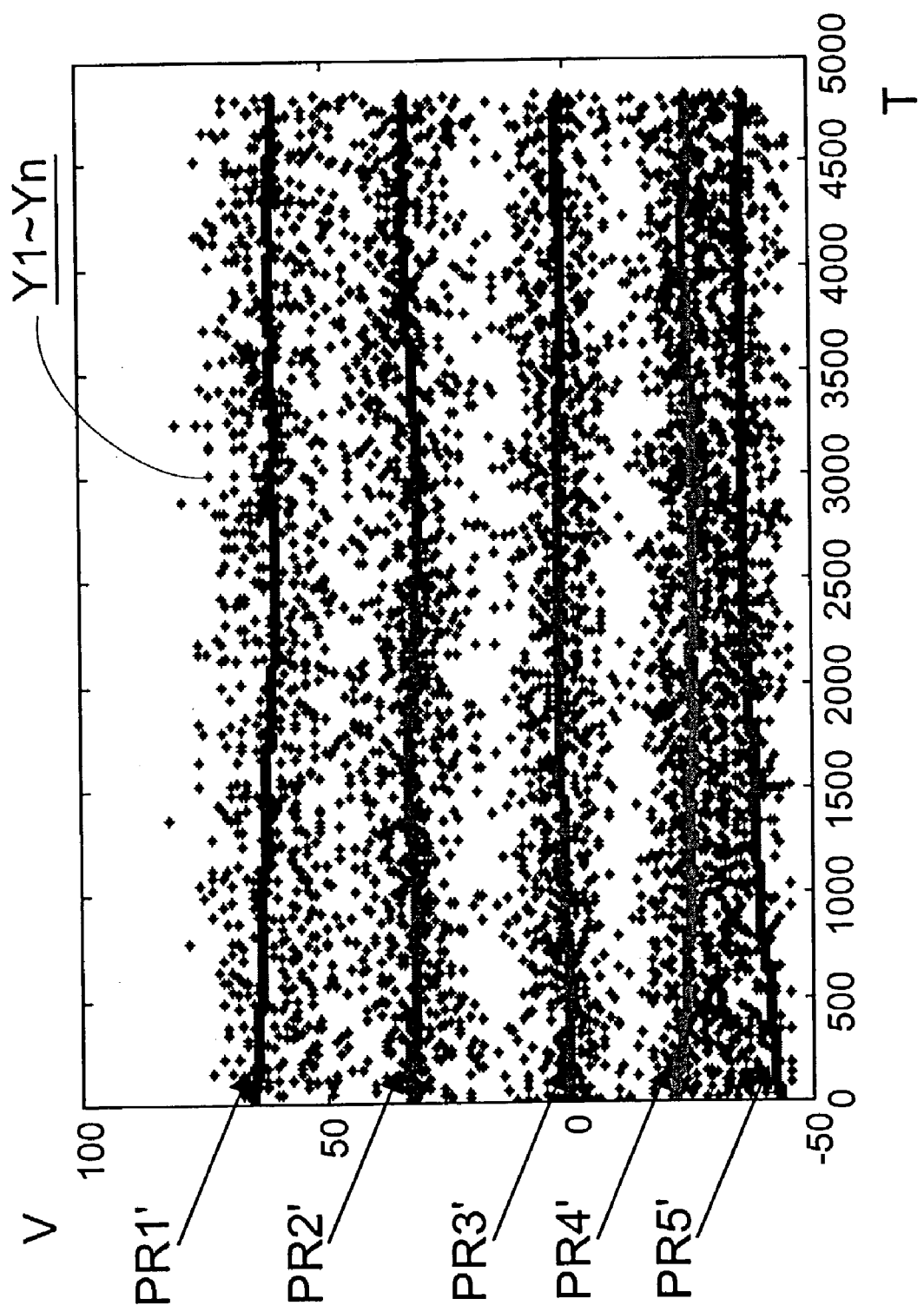
FIG. 4 is a plot illustrating the electric level distribution range of sampled signals and the located reference levels.

The above-mentioned procedures are repeated for the other sampled signal Y4~Yn to update the reference levels. Consequently, the electric level distribution range of the sampled signals Y1~Yn, i.e. the five reference levels finally updated, is effectively located. An exemplified plot can be seen in FIG. 4. The resolution of the sampled signal in FIG. 4 is of 7 bits.

Preferably, the levels PR1~PRm are interlacingly adjusted. For example, when the level PR2 is adjusted, the other levels are kept unchanged. Then, the reference levels PR1'~PRm' are outputted via the output end O for the subsequent decoding procedures.

In the embodiment of FIGS. 3(a)~3(d), the adjustment of the reference levels is performed one by one of the sampled signals. Sampled signals beyond a reasonable range may be disregarded from the level-adjusting procedure. Alternatively, the corresponding and adjusting procedures can be performed group by group of the sampled signals.

The process for recovering data from an optical storage medium according to the present invention can effectively avoid the deviation from predetermined reference electric levels PR_level due to some non-linear factors in the prior art. Therefore, the digital data Is1 could be correctly recovered via the decoding device, and the bit error rate (BER) is minimized.

The present invention is illustrated by referring to an optical storage/recording medium such as a compact disks (CD), a video compact disk (VCD) and a digital versatile disk (DVD). Nevertheless, the present invention can also be applied to a compact disk-read only memory (CD-ROM), a digital versatile disk-read only memory (DVD-ROM), a compact disk-recordable (CD-R), a compact disk-rewritable (CD-RW), a digital versatile disk-recordable (DVD-R), a digital versatile disk-rewritable (DVD-RW) and a digital versatile disk-random access memory (DVD-RAM).

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for locating an electric level distribution range of sampled signals, said electric level distribution range including a plurality of reference levels, said method comprising steps of:
   providing a plurality of initial values;
   corresponding each of said sampled signals to one of said plurality of initial values, which is closest thereto; and
   adjusting said initial values with said sampled signals respectively corresponding to said initial values according to a predetermined operation, thereby realizing said reference levels,
   wherein said predetermined operation is least mean square (LMS) operation performed by means of the following equations:

$$\frac{\partial (z-lx)^2}{\partial lx} = -2(z-lx) \quad (1)$$

$$lx' = lx + \gamma(z-lx) \quad (2)$$

where
- lx' is one of said reference levels,
- γ is an operation factor,
- z is an electric level of one of said sampled signals, and lx is one of said initial values, which is corresponded by said one of said sampled signals.

2. The method according to claim 1 wherein said adjusting step of said initial values is performed one by one of said sampled signals.

3. The method according to claim 1 wherein said adjusting step of said initial values is performed group by group of said sampled signals.

4. The method according to claim 1 wherein said initial values are interlacingly adjusted.

5. The method according to claim 1 wherein said sampled signals are synchronously sampled signals.

6. A method for recovering data from an optical storage medium, comprising steps of:
sampling signals associated with data from an optical storage medium; locating an electric level distribution range of said sampled signals by realizing a plurality of reference levels according to a predetermined operation; and
decoding said sampled signals to recover data according to said electric level distribution ranges,
wherein said predetermined operation is a least mean square (LMS) operation performed by means of the following equations:

$$\frac{\partial (z-lx)^2}{\partial lx} = -2(z-lx) \quad (1)$$

$$lx' = lx + \gamma(z-lx) \quad (2)$$

where
lx' is one of said reference levels,
γ is an operation factor,
z is an electric level of one of said sampled signals, and
lx is one of initial reference values.

7. The method according to claim 6 wherein said sampled signals are decoded according to said plurality of reference levels.

8. The method according to claim 6 wherein said plurality of reference levels are located by steps of:
corresponding each of said sampled signals to one of said initial reference values, which is closest thereto; and
adjusting said initial reference values corresponded by said sampled signals according to said predetermined operation, thereby realizing said reference levels.

9. The method according to claim 8 wherein said initial reference values are interlacingly adjusted.

10. The method according to claim 6 wherein said sampled signals are synchronously sampled signals.

11. A control chip for use with an optical storage medium, comprising:
a sampling device generating sampled signals according to data stored in said optical storage medium;
an adjusting device in communication with said sampling device, locating reference levels according to a predetermined operation of electric levels of said sampled signals and a plurality of preset levels; and
a decoding device in communication with said adjusting device, recovering data according to said sampled signals and said reference levels,
wherein said predetermined operation is a least mean square (LMS) operation performed by means of equations:

$$\frac{\partial (z-lx)^2}{\partial lx} = -2(z-lx) \quad (1)$$

$$lx' = lx + \gamma(z-lx) \quad (2)$$

where
lx' is one of said reference levels,
γ is an operation factor,
z is one of said electric levels of said sampled signals, and
lx is one of said preset levels.

12. The control chip according to claim 11 wherein said optical storage medium is an optical disc.

13. The control chip according to claim 11 wherein said sampling device generates said sampled signals by means of a synchronously sampling procedure.

14. The control chip according to claim 11 wherein said adjusting device corresponds each of said sampled signals to one of said plurality of preset levels, which is closest to said sampled signal, and adjusts said preset levels corresponded by said sampled signals into said reference levels.

* * * * *